No. 648,479. Patented May 1, 1900.
L. BAEBLER.
TUBE INSERTER FOR PNEUMATIC TIRES.
(Application filed Sept. 11, 1899.)
(No Model.)
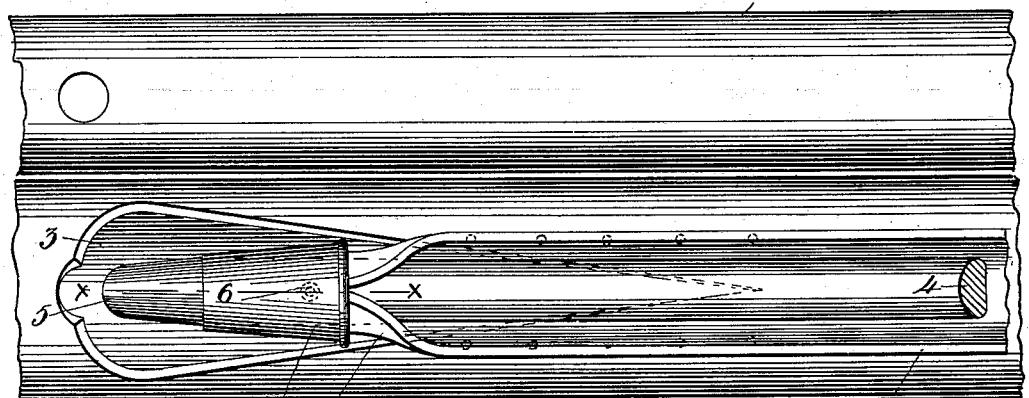
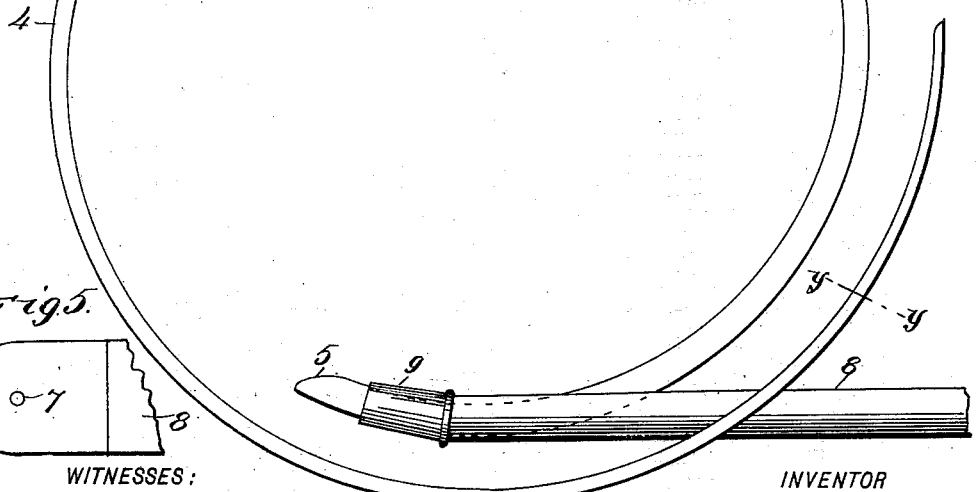
WITNESSES:
INVENTOR
Louis Baebler.
BY
ATTORNEYS.

UNITED STATES PATENT OFFICE.

LOUIS BAEBLER, OF ST. LOUIS, MISSOURI.

TUBE-INSERTER FOR PNEUMATIC TIRES.

SPECIFICATION forming part of Letters Patent No. 648,479, dated May 1, 1900.

Application filed September 11, 1899. Serial No. 730,095. (No model.)

*To all whom it may concern:*

Be it known that I, LOUIS BAEBLER, a citizen of the United States, residing at St. Louis, in the State of Missouri, have invented certain new and useful Improvements in Tube-Inserters for Pneumatic Tires; and I do hereby declare the following to be a full, clear, and exact description of the invention, such as will enable others skilled in the art to which it appertains to make and use the same.

My invention relates to improvements in tube-inserters for pneumatic tires and fasteners for tires; and it consists in the novel combination and arrangement of parts, as will be hereinafter more particularly described and claimed.

In the drawings, Figure 1 is a plan view of a portion of a rim and tire, the latter having been removed from the former, with my invention in a position for inserting the inner tube within the tire. Fig. 2, is a plan view of a spiral rod which I employ in carrying out my invention, with one end of the tube attached thereto. Fig. 3 is a detail view in section of one end of the inserting-rod, with parts in their proper position. Fig. 4 is a transverse section of the rod, taken on the line $x\ x$ of Fig. 2, showing the shape of the same; and Fig. 5 is a detail plan view of one of the tubes.

The object of my invention is to devise the simple device in the form of a spiral rod, to one end of which is removably attached one end of the inner tube, whereby the latter will conform to the rod or embrace the same as the rod, together with the tube, is inserted into the tire, whereby the said tube is readily and conveniently inserted into the tire in its proper position in respect to the latter, and thus it is impossible for the tube to become twisted or disarranged within the tire in the operation of inserting the same, and, further, by the employment of the device hereinafter described the wheel or other parts comprising the bicycle are not removed or detached in order to insert the tube, the tire merely being released from the rim about its laced portion and pulled to one side of the rim in order to gain access to the laced opening of the tire for inserting the tube.

A further and very important feature of my invention consists of a simple and practical fastening device for rigidly securing the tire to the rim of the wheel, which consists of an L-shaped bolt, the inner horizontal portion of which is covered with rubber or other soft material and adapted to be brought in contact with the inner surface of the tire, the vertical portion of said bolt passing through openings formed for its reception and the tire and rim, respectively, the lower end of the vertical portion of the bolt being provided with screw-threads upon which a nut is screwed and against the rim or washer interposed between the rim and nut, whereby the parts are securely held together, it being observed that any number of these fastening devices may be employed and arranged at suitable intervals apart and in addition cement used in order to further hold the parts together. The fastening device above described will prevent all longitudinal movement of the tire in respect to the rim, and thus it will be seen that the pipe carried by the inner tube, to which the ordinary air-pump is attached, will not become broken or disarranged, as is a common annoyance with other tire-fastening devices.

Referring to the drawings, 1 represents the ordinary rim of a bicycle, 2 the rubber tire, and 3 the laced opening, all of which are of the usual construction.

My invention resides particularly in a spiral-shaped tapering rod 4, which is preferably constructed from reed-wood, although I do not limit myself to the material employed in constructing the rod, the enlarged end of said rod being provided with a tapering inserting end 5, and secured to the under side of said rod, adjacent to said end, is a pin 6, which is adapted to be inserted through the opening 7, formed in one end of the inner tube 8, after which the said tube is folded about the rod and a rubber nipple 9 passed over the rod and attached end of the inner tube, whereby the latter is securely held in its proper position to the inserting end of the rod for properly inserting the tube within the tire. Before inserting the rod, together with the tube, within the tire the laced opening of the latter is held open or stretched by any suitable device adapted for the purpose, whereby the said rod, together with the tube attached thereto, may be readily and conveniently inserted within said tire, the position for inserting being clearly shown in Fig. 1 of the drawings. In the operation of inserting the rod, together with the tube attached thereto, within the tire the only care that is necessary to be taken is that the tube should be equally folded about the rod as the latter is being inserted, after which the rod is easily detached from the tube and the latter will be in its proper position within the tire. The opposite end of the spiral inserting-rod 4 is properly shaped or tapers, which end is employed for releasing the inner tube from the inner wall of the tire should the same adhere to the latter, which is accomplished by forcing said end between the tube and tire or surfaces adhering, whereby the parts will readily become released.

From the foregoing description it will be seen that should the inner tube become punctured, which is a very common annoyance, it can readily be removed, the puncture mended, and the tube again inserted into the tire with very little inconvenience and within a minimum length of time.

Having fully described my invention, what I claim is—

1. A tube-inserter for pneumatic tires, comprising a tapering spiral rod, a pin secured to the same adjacent to its enlarged end, and adapted to be inserted into a suitable opening formed in one end of an ordinary inner tube, and a nipple passed over said enlarged end of the rod, and the attached end of the tube, as and for the purpose described.

2. A tube-inserter for pneumatic tires, comprising a tapering spiral rod, one end of which is enlarged and pointed, a fastening device secured to said rod, and located a suitable distance from said end, the opposite end of said rod being reduced, as and for the purpose described.

In testimony whereof I affix my signature in presence of two witnesses.

LOUIS BAEBLER.

Witnesses:
ALFRED A. MATHEY,
C. F. KELLER.